United States Patent [19]

Burbank, Jr.

[11] Patent Number: 4,534,228
[45] Date of Patent: Aug. 13, 1985

[54] WIRELINE TENSION GAGE

[76] Inventor: Edward W. Burbank, Jr., 9604 Briar Forest, Houston, Tex. 77063

[21] Appl. No.: 462,608

[22] Filed: Jan. 31, 1983

[51] Int. Cl.³ .............................................. G01L 5/08
[52] U.S. Cl. .................................................. 73/862.45
[58] Field of Search ........... 73/862.45, 862.47, 862.48, 73/1 B, 862.58

[56] References Cited

U.S. PATENT DOCUMENTS

| | | | |
|---|---|---|---|
| 1,771,339 | 7/1930 | Martin | 73/862.45 |
| 2,703,008 | 3/1955 | Seljos | 73/862.45 X |
| 3,031,169 | 4/1962 | Robinson | 254/173 |
| 3,176,510 | 4/1965 | Kimmell | 73/862.45 |
| 3,310,981 | 3/1967 | Nixon | 73/862.45 |
| 3,372,582 | 3/1968 | Weiss | 73/862.45 |
| 3,484,807 | 12/1969 | Roden | 73/1 B |

OTHER PUBLICATIONS

Bear MFG Corporation, "Assembly Installation of Strain Guage D-1-80", C-364, 6/21/77.

Primary Examiner—James L. Rowland
Assistant Examiner—Brian R. Tumm
Attorney, Agent, or Firm—Vaden, Eickenroht, Thompson & Jamison

[57]     ABSTRACT

A tension gage for ready mounting upon a wireline between its load and free ends and adapted to provide measurements of tension conditions exerted upon the wireline. The tension gage has a body with a central post to engage the wireline in a saddle mount and connected with a transmitter which produces a pneumatic signal indicative of wireline forces acting on the post. Rollers at each end of the body engage and laterally displace at certain angles the wireline to each side of the post. The rollers are mounted on eccentric pivots whereby the rollers can be moved to release or engage the wireline over predetermined distances. Swinging bridge roller mounts allow the body to be placed with the post against the wireline, and then, locked to it in operative position. An adjustment calibrates the transmitter to zero line tension conditions for using the tension gage as an accurate weight indicator. The gage is without loose parts and is roughneck proof in installation, especially on oil well drilling rigs.

22 Claims, 13 Drawing Figures

WIRELINE TENSION GAGE

BACKGROUND OF THE INVENTION

1. Field of the Invention

This invention relates to apparatus used for measuring and testing, and more particularly, it relates to measuring and testing systems used in connection with the drilling of oil wells.

2. Description of Prior Art

Rotary drilling for making a well bore into the earth for the production of oil and gas materials has been practiced since the early twentieth century and its many advantages have been appreciated. Although the components of the well drill string appear to be massive and of great strength when viewed at the earths surface, the well drill string in even a moderately deep well, is in reality a highly flexible and relatively easy to damage drilling tool. Controlling the drill string weight applied to the drill bit is most important for drilling efficiency.

Also, the derrick appears to be massive and of exceptional strength and this is true in all properly designed drilling rigs. For example, the derrick may support a load of 250 tons. An important part of the rig is wire rope or steel cable or wireline that is used to moveably suspend the drill string from the derrick. The cable at one end is wound on a drum or windless and is then passed in several turns between the crown block and traveling block. The other cable end is secured at the derrick foundation or base. The traveling block carries a hook with rotary connection to the kelly. The hook supports the weight of the drill string within the well bore and applied to the drill bit. The cable is usually multi strand with multi wires per strand. For example, a cable or wireline of $1\frac{1}{8}$ inch diameter can have fiber core surrounded by eight strands each having 19 steel wires. This cable has a breaking strength of about 40 tons but yet is pliable and wear resistant. Although these cables are of great strength, they do have some finite load limit where a breaking problem can occur.

The tension conditions on the wireline in virtually every rotary drilling rig is monitored during present day drilling operations. Various tension measuring systems are employed in the functions of automatic drillers and weight indicators so that the driller has an indication of tension conditions on the wireline and also to control automatically the drill string weight upon the drill bit. One commercial system is shown in U.S. Pat. No. 3,031,169 to A. I. Robinson et al., which issued Apr. 24, 1962 and entitled "Apparatus for Automatically Controlling Drilling". In this system a sensor device is bolted to the wireline and produces a pneumatic signal to a meter on the derrick floor so the driller had some indication of tension conditions on the wireline, especially changes in tension. It could also automatically maintain a selected weight-on-bit loading during drilling.

The sensor device or strain gage was disc shaped and engaged the wireline in a three point attachment between a central plunger and equal distant end supports. The wireline was deflected at small equal angles ($\theta$) into the two sides of an isosceles triangle whose base was a straight line between the supports. The wireline tension (T) acted on the plunger with a force (F) according to the formula $T = F/2 \sin \theta$. The force (F) on the plunger controlled a transmitter that generated the pneumatic signal to the remote, floor mounted receiver. For accuracy the end supports, usually bolted to the wireline, must let it slide a small longitudinal distance during the tension condition measurement.

One improved sensor device used rollers on the end supports for engaging the wireline but yet letting it move a small longitudinal distance in making these measurements. The roller supports were threadedly mounted directly onto the disc. A threaded stop controlled the lateral displacement of the wireline against the plunger.

Another problem with tension measuring system resides in the stiffness of wirelines (e.g., 1 inch or larger in diameter). These lines do not bend readily at the end supports and central plunger of the sensor device to form an accurate isosceles triangle shape. Rather, the stiff wirelines tend to form merging curves and not precise angles at the end supports and central plunger. As a result, there is some magnitude of the Force (F) acting on the central plunger even under zero wireline tension conditions. For this reason, prior tension measuring systems always had an indicated weight readout of some magnitude even under absolute zero tension conditions on the wireline.

These prior sensor devices also all have had a major problem associated with mounting the device on the wireline. It will be appreciated that a well worker or roughneck usually mounts the sensor device on the wireline. This installation is below the derrick floor where the end of the wireline is anchored to the derrick foundation. No more difficult work area can be found. This work area is cluttered with piping, valves, hoses, etc. and everything is coated with either mud, water or oil or all three materials. If a nut, part or tool is dropped, it just disappears. As a result, the well worker has had great problems mounting the sensor device onto the wireline at its anchored end. The many loose pieces, especially nuts and bolts invite one or more pieces to fall and be lost. Usually, a replacement piece cannot be found and this results in the supplier of the device making a trip (usually at no charge) to the well site to supply the lost parts.

Also, the wirelines vary in sizes and characteristics and required the well workers to repeatedly adjust, change, and then move, cut and try to adjust the sensor device to give proper and useful readouts of tension conditions on the wireline and indicated weight on the wireline. These precise adjustments are most difficult because of the location of the sensor device.

The present invention is a tension gage that is readily installed on the wireline adjacent its anchor end, usually by one person, and it has no loose parts that can be dropped or otherwise lost. The installation automatically insures the proper adjustment to provide proper and useful readouts of tension conditions on the wireline. The tension gage is readily and easily adjusted where different wireline characteristics are encountered. Adjustment is provided for easily adjusting the gage to zero wireline tension for a direct readout of zero indicated weight on the wireline.

SUMMARY OF THE INVENTION

In accordance with this invention, there is provided in a preferred embodiment of a tension gage device for mounting on a wireline between its load and anchor ends. The gage has an elongated body with a post therein and the post at one end has a saddle to support the wireline. The post connects with a transmitter for producing a signal responsive to wireline forces acting on the post. At least one end of the body carries a roller mounted on an eccentric pivot either for lifting the roller from the wireline, or for engaging securely in locked position the wireline and displacing same a small lateral distance at each end of the body. The wireline can move under each roller but is securely held in the saddle on the post. Transmitter signals are detected to provide measurements of tension conditions upon the wireline.

In other embodiments, adjustments are provided in the gage for correction to zero wireline tension conditions so true readings indicate weight on the wireline can be made.

DESCRIPTION OF PREFERRED EMBODIMENTS

Figure 1:
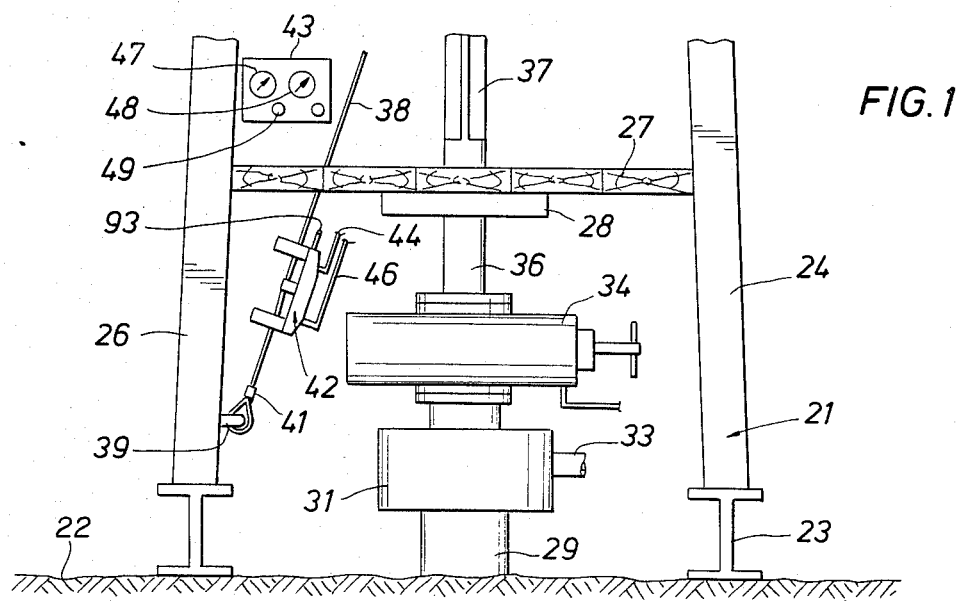
FIG. 1 is a perspective view of the beneath floor space of an oil well derrick where a wireline tension gage of the present invention has been installed and connected into an automatic driller system.

Referring now to FIG. 1, there is shown a preferred embodiment of the present tension gage attached to the steel cable or wireline employed with an oil well derrick 21. The derrick 21 comprises beam supports 23 which rest upon the earth's surface 22, and several upstandings legs 24 and 26 which support the machinery and operating elements required to drill an oil well. Between the legs of the derrick 21 there is provided a floor 27 about a drive table 28 and supporting other equipment used by the workmen in carrying out the drilling operation. The drive table 28 is superimposed above a well casing 29 which is usually cemented to the earth's formations for about 1500 feet at the upper portion of the well bore. The casing 29 carries a mud head assembly 31 whereby the returning drilling mud is moved by a conduit 33 to the mud reconditioning system. Above the mud head 31 is mounted a blow out preventer 34 which can be manually and air operated. The drill string 36 passes downwardly from the drive table through the preventer and down through the casing 29 into the well bore. Mounted atop the drill string 36 and extending through the drive table 28 is a kelly 37 which engages upon drive surfaces within the drive table 28 and rotates the drill string 36 in the well bore. The kelly 37 is supported from a crown block (not shown) atop the derrick 31 by a plurality of wireline loops extending to a traveling block carrying a hook (not shown) which is connected by a swivel joint to the top of the kelly 37. The wireline at one end is carried upon a windless which is power rotated so that the drill string may be raised and lowered within the well bore. The other end of the wireline 38 is secured beneath the floor 27 to the derrick 21. More particularly, the anchor end of the wireline 38 is passed through a suitable shackle 39 and secured by clips 41.

It is important to know the amount of weight supported by the hook, which is reflected by the tension exerted upon the wireline by the weight of the drill string 36 during the drilling operations. The tension upon the wireline 38 is determined by the novel tension gage 42 of this embodiment which is secured upon the wireline adjacent its anchored end at shackle 39. The gage 42 is connected by suitable signal lines to a floor mounted automatic drilling readout device 43. For example, the signals may be carried between the gage 42 and the readout device 43 by air hoses 46 and 44, respectively, that provide instrument air and the pneumatic control signals representing the tension conditions upon the wireline 38.

It will be apparent that the gage 42 may be mounted at any convenient place on the derrick such as beneath the floor 27 after the rig is set up for drilling. Under these conditions, the gage 42 provides great advantages to the roughnecks who must install the equipment beneath the derrick floor 27. A special advantage of the present invention is that the roughnecks can install the gage 42 beneath the derrick floor 27 by a very simple procedure and not suffer the burden of assembling a multitude of loose parts that can be readily lost or dropped beneath the floor 27.

The readout unit 43 may have one pressure gage 47 that indicates the total magnitude of tension exert on the wireline 43. A second pressure gage 48 can be preset by a control 49 so as to indicate changes in the tension conditions upon the wireline and operate the windless for automatic weight control during drilling. Thus, the driller operating the machinery associated with the derrick 21 can select and monitor the tension conditions in the automatic driller readout device 43.

Figure 2:
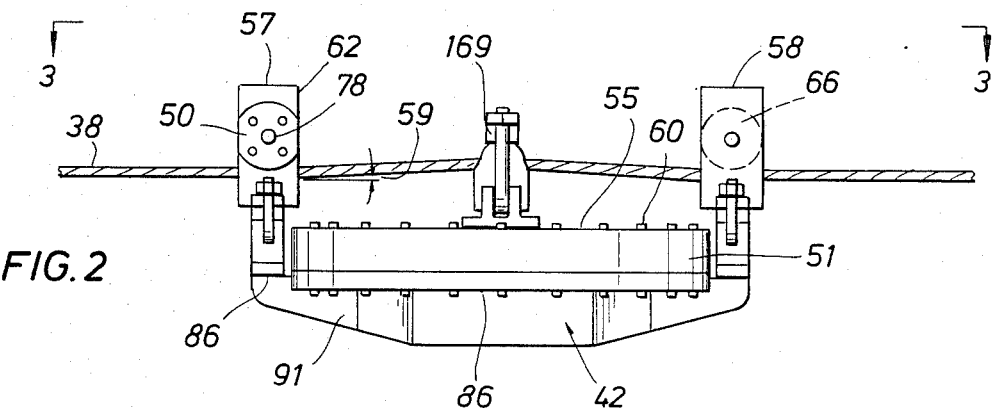
FIG. 2 is an enlarged side view of the tension gage shown in FIG. 1.
Figure 11:
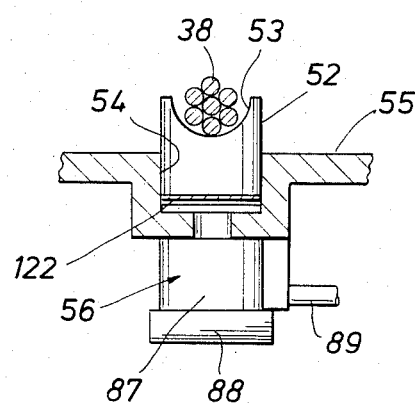
FIG. 11 is an enlarged partial section taken along line 11—11 of the tension gage shown in FIG. 10.

Referring now to FIG. 2, the gage 42 is shown in an enlarged side view. The gage 42 includes a metal body 51 which is longitudinally oriented with the wireline 38. In addition, the body 51 carries a post 52 that is mounted centrally therein. The post at one end carries a saddle 53 which is adapted to support the wireline 38. Referring momentarily to FIG. 11, the post 52 resides within a chamber 54 formed in the body 51. The wireline forces acting on the post 52 are sensed by an internal transducer 56 that modulates the signal air in the hose 46 to produce a representative output signal in the hose 44. As a result, the magnitude and changes of the signal in the hose 44 are representative of the tension conditions exerted by the wireline 38 against the post 52 within the body 51.

Figure 3:
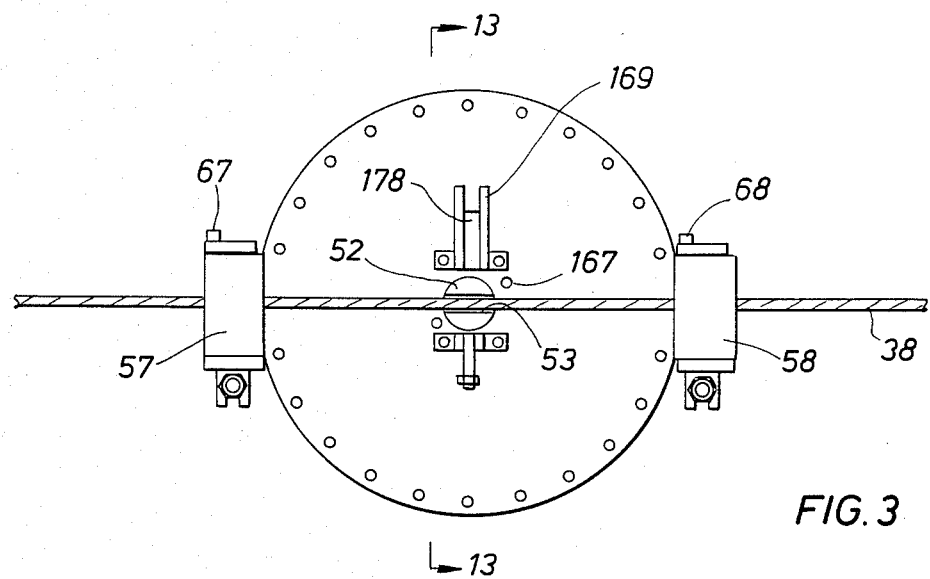
FIG. 3 is a plan view of the tension gage.

As seen in FIGS. 2 and 3 the wireline 38 is held within the saddle 53 of the post 52 by a pair of roller assemblies 57 and 58 that are integrally carried upon the body 51 at opposite sides of the post 52 but in alignment with the wireline 38 that rests within the saddle 53. The roller assemblies 57 and 58 are so arranged as to depress the wireline 38 laterally a certain distance towards the body 51. This wireline depression produces angle 59 between the remainder of the wireline and its lateral displacements to each side of the post 52. These angles are very small and correlate trignometrically to the tension forces of the wireline that act upon the post 52 which then coacts with the transducer 56 to produce a tension condition signal. If the transducer 56 is insensitive, these angles must be relatively large. A pneumatic, self-balancing transducer 56 provides signals in the hose 44 in sufficient magnitudes so that the angles 59 and 61 can be each about two degrees. Preferably, the angles to which the wireline 38 is depressed at each side of the post 52 are identical. In this regard, identical roller assemblies 57 and 58 will generally be spaced an equal distance from the post 52 upon the body 51.

For best results, both of the roller assemblies are arranged so that their sheaves 64 and 66 can be selectively moved to depress the wireline 38 towards the body 51. If desired, only one of these roller assemblies 57 and 58 needs to be arranged for movement and the other of the roller assembly can be secured at a fixed spacing from the body 51. However, it is preferred that both roller assemblies have sheaves adapted for movement in depressing laterally the wireline 38.

Preferably, the roller assemblies 57 and 58 are comprised of upstanding bridges 62 and 63, respectively, secured to the base 51. Sheaves 64 and 66 are journaled to the bridges in a movable mounting, such as by eccentric pivots so that in a first position, the sheaves are lifted from the wireline and in a second position, the sheaves engage the wireline to displace same towards the flat top surface 55 of the base 51. The eccentric pivots of the sheaves are moved between the first and second positions by operating levers 67 and 68.

Figure 5:
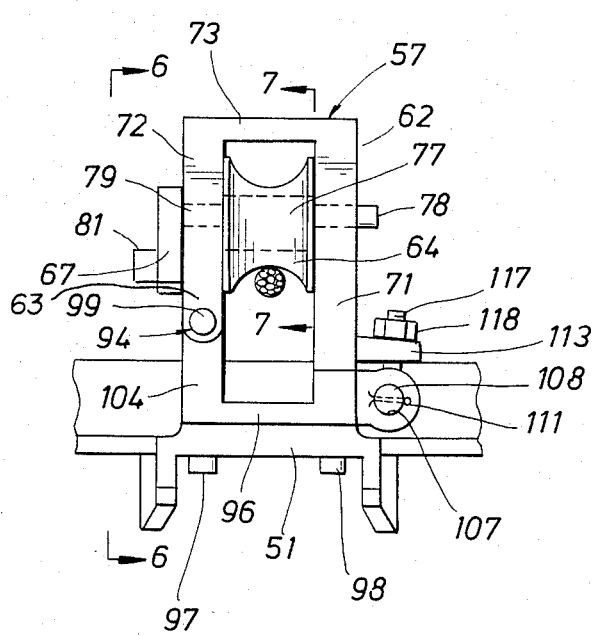
FIG. 5 is an enlarged partial end view of the tension gage of FIG. 3.
Figure 6:
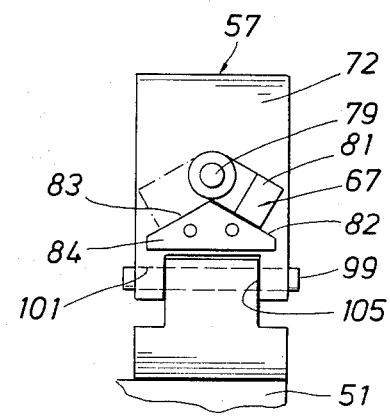
FIG. 6 is an enlarged partial elevation of the tension gage of FIG. 3.
Figure 7:
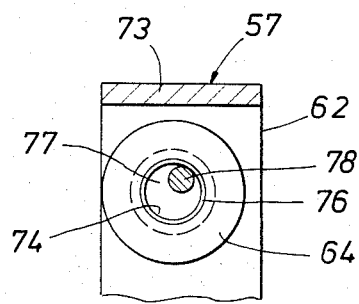
FIG. 7 is a sectional taken along line 7—7 of FIG. 5.

The construction of the roller assemblies 57 and 58 can be appreciated more fully by reference to the FIGS. 5-8. These roller assemblies are identical in function, and therefore, only the assembly 57 will be described in detail. The assembly 57 includes the bridge 62 which is formed by side members 71 and 72 that are interconnected by a top member 73. Preferably, the members are made in one piece by steel casting techniques. In this construction, a sideplate 50 held by screws form an end mounted journal for the sheave. The sheave 64 contains a central opening 74 in which is inserted a bearing 76. Within the bearing 76 is carried a cylindrical shaft 77. The ends of the cylindrical shaft 77 carry eccentrically placed aligned shafts 78 and 79. The shafts 78 and 79 extend through suitable openings in the side members 71 and 72. The sheave 64 and the shaft 77 move eccentrically about the shafts 78 and 79 upon their rotation in the members 71 and 72. The shaft 79 is secured to a lever 67. The lever 67 is keyed or pinned at one end to the shaft 79 and carries a four-sided projection 81 adapted to be gripped by a wrench. The lever 67 is turned with a wrench for the eccentric pivoting of the sheave 64 between the first and second positions. As a result of the stiffness of the wireline, the sheave 64 will remain in either limit position without an auxiliary locking mechanism. The lever 67 is shown in FIG. 6 in the second position (hardline display) abutting against a limiting surface 82 and in the first position (phantom display) abutting a limiting surface 83 on a position limit stop 84 bolted to side member 72. Other arrangements for the eccentric pivoting of the sheave between two limits may be utilized, if desired. The roller assembly 58 is constructed identically to the roller assembly 57, and thusly it functions in an identical manner.

Figure 4:
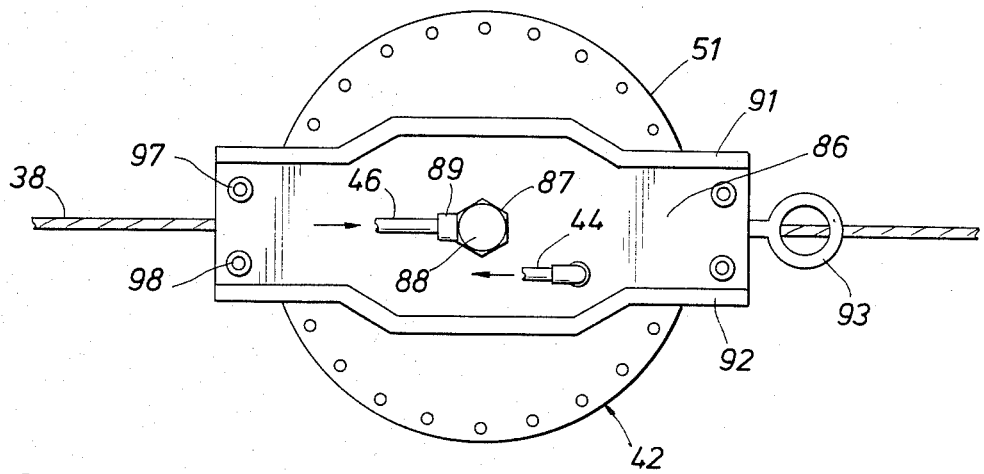
FIG. 4 is a bottom view of the tension gage.

The top surface 55 of the gage 42 is preferably provided by a flat metal plate which is secured to the body 51 by peripheral bolts 60. Thus, the internal portions of the body 51 are readily accessible for construction, repair or servicing as may be desired. Preferably, the transducer is readily accessible from the bottom of the gage 42. Referring to FIG. 4, the bottom of the gage 42 is formed of a flat surface 86 which has a centrally located projection 87 that is sealed by a threaded cap 88. The hose 46 is releaseably connected through a hose connection upon a nipple 89 that extends at right angles from the projection 87. With the cap 88 removed, the internal operating mechanism of the transducer 56 is readily accessible for cleaning, replacement or servicing as may be desired. Because the transducer 56 is readily accessible from the bottom surface 86 of the body 51, the gage 42 does not need to be removed from its operative mounting upon the wireline 38 in order to service the transmitter 56 during drilling operations. The exposed hose connections can be protected by a pair of laterally extending ribs 91 and 92 that extend from the lower surface 86 of the body 51. The ribs also serve to stiffen the body 51 against bending in mounting the roller assemblies 57 and therefore providing a more linear signal output closely proportional to strain on wireline 38. At one end of the body 51 is carried an eye-bolt 93 from which the gage 42 can be held by a rope or small cable during installation.

Figure 9:
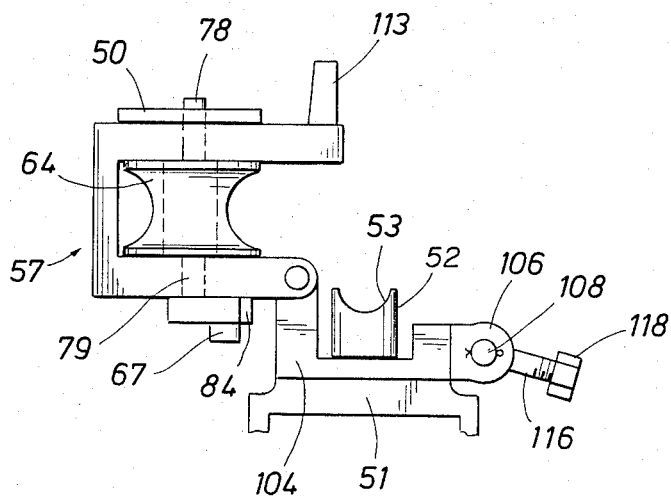
FIG. 9 is the view of FIG. 5 but with the roller assembly opened and swung to one side to release the wireline.

An important feature of the present invention is the arrangement of the roller assemblies 57 and 58 so that they are simply and easily opened to permit the gage 42 to be attached to or released from, the wireline 38. Referring to FIGS. 5, 6 and 9, the roller assembly 57 is mounted upon the body 51 by a swinging mount so that the bridge 62 can be swung to one side to permit the cable 38 to be removed or installed relative to the post 53. More particularly, the side member 72 is mounted by a hinged connection 94 to a base member 96 that is secured to the body 51 by studs 97 and 98. The hinge connection 94 is provided by a thru-pin 99 that is secured in the side member 72 by cotter pins. The base 96 has a projecting portion 104 that is received within a central opening 105 in the side member 72. The projection 104 has a transverse hole to receive the pin 99. As a result, the bridge 62 can be swung about the pivoted connection 94 relative to the base 51. With this arrangement, the cable 38 can be readily installed beneath the roller assemblies 57 and 58 or removed from the saddle 53 of the post 52.

Figure 8:
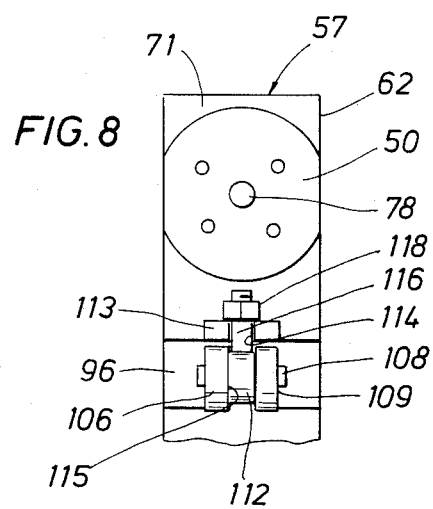
FIG. 8 is an enlarged partial elevation of the tension gage of FIG. 3.

The side member 71 is releaseably secured to the base 96 by a locking arrangement that is readily handled by the roughnecks working on the derrick 21. For this purpose, the base 96 has an outward projection 106 which has an opening 107 to receive a thru-pin 108 that is secured on one side by an enlarged head 109 and on its other side by a cotter pin 111. As can be seen in FIG. 8, the projection 106 extends to each side of a central opening 115 in which is positioned the enclosed end of an eye-bolt 112. Thus, the eye-bolt 112 is journaled upon the pin 108. The side member 71 carries a lateral projection 113 which is in parallel with the projection 106 of the base 96 as can be seen best in FIG. 5. The projection 106 carries a central slot 114 to receive the threaded portion 116 of the eye-bolt 112. The threaded portion 116 is flattened at end 117 so that a captive nut 118 is carried upon the eye-bolt 112. Thus, with the nut 118 threadedly down against the projection 113, the bridge 62 is rigidly mounted upon the base 96 and the body 51 of the tension gage 42. When the bolt is unthreaded against the enlargement 117, the swing rod or bolt 112 pivots to one side as is shown in FIG. 9. At this time, the bridge 62 is swung about its pivotal mounting 94 so that it is completely clear of the wireline 38.

It will be apparent from the foregoing description of the roller assembly 57, and in like arrangement the roller assembly 58, that the bridges are readily released and swung to one side so as to provide free clearance to the cable 38 in its installation or removal relative to the saddle 53 of the post 52. Importantly, there are no loose pieces or parts that can be lost with this novel arrangement to facilitate the mounting of the gage 42 upon the wireline 38.

The gage 42 with both of the roller assemblies 57 and 58 released and swung to one side can be supported by a rope in the eye-bolt 93 and held at a suitable position adjacent the anchor end of the wireline 38. Then, the gage 42 is moved so that the wireline 38 is received within the saddle 53 of the post 52. At that time, using one hand, one roughneck can close the bridges on their bases, move the eyebolts into the projections 113 of the side member 71. Then, the captive nut 118 is threaded downwardly against the projection 113. Now, the levers 67 and 68 are rotated into the second position. As a result, the sheaves each displace the wireline 38 laterally a precise distance towards the flat surface 55 on the top portion of the body 51. Automatically, the deflection angle 59 associated with the wireline to each side of the post 52 are made equal and of a predetermined magnitude for a certain wireline 38.

At times, it may be desirable to employ the gage 42 with different size cables. For this purpose, the roller assemblies and post 52 are changed so that the lateral displacements of the wireline is at the previously discussed angle 59.

Figure 10:
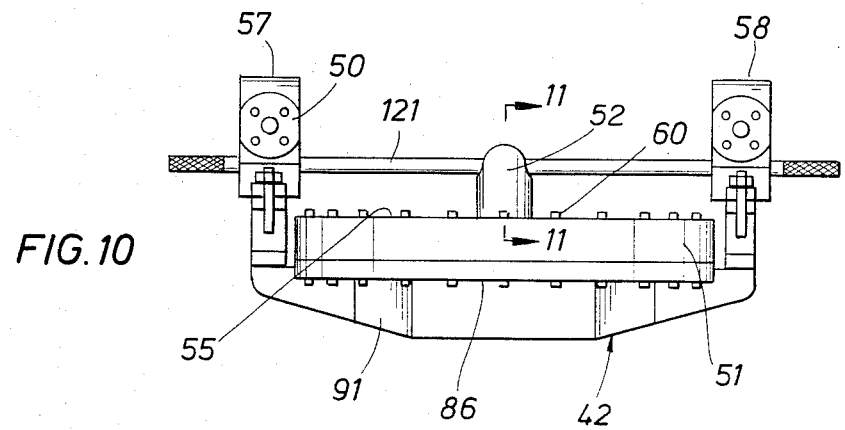
FIG. 10 is a view like FIG. 2 but with a calibration rod substituted for the wireline.

In order to calibrate the gage 42, the arrangement shown in FIG. 10 is employed. The gage 42 is released from a wireline 38 and the bridges closed and secured through the captive nuts 118 associated with the eyebolts. The eccentric pivots of the sheaves are moved into the first position and a calibration rod 121 is inserted beneath the sheaves in the roller assemblies. Then, the levers 67 and 68 are moved into the second position to depress the rod 121 against the post 52. At this time, a certain readout will be received upon the automatic driller 43 at the derrick floor 27. If this readout signal is not of the desired range or calibrating magnitude, the levers 67 and 68 are returned to the first position, the rod 121 removed and a shim 122 is positioned between the bottom of the removable post 52 and the sensor rod 123 associated with the transducer 56. Shims of a thickness are introduced so that when the calibration rod 122 is again locked into position, the post 52 is acted upon by the rod forces in the desired amount and brings the gage into the proper calibration for indicating the tension conditions upon the wireline 38. Once the desired tension condition calibrating arrangement is obtained, the rod 121 is removed and the gage 42 mounted upon a wireline 38 and placed into an operative condition for indicating the tension conditions thereon.

Figure 12:
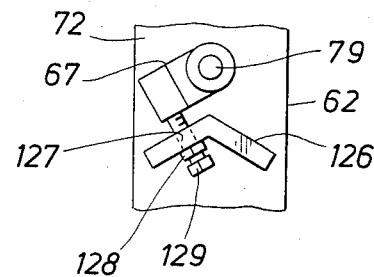
FIG. 12 is an alternative embodiment to the structure shown in FIG. 6.

An alternative arrangement to calibrate the gage 42 is shown in FIG. 12. The side member 72 is provided by casting or other fabrication a chevron-like boss 126 which is the first position limit surface 82 for the lever 67. The second position limit for the lever is adjustable by a cap bolt 129 which threads through opening 127 in the boss 126. A lock nut 128 insures holding a certain threaded placement of the bolt 128. The bolt 128 is adjusted against the lever which correspondingly moves the sheave 64 relative the engaged wireline 38. As a result, the bolt 128 determines the lateral displacement of the wireline 38, and the wireline forces acting upon the post 52. Therefore, the gage 42 can be precisely calibrated to a certain wireline tension condition using the bolt 129.

Figure 13:
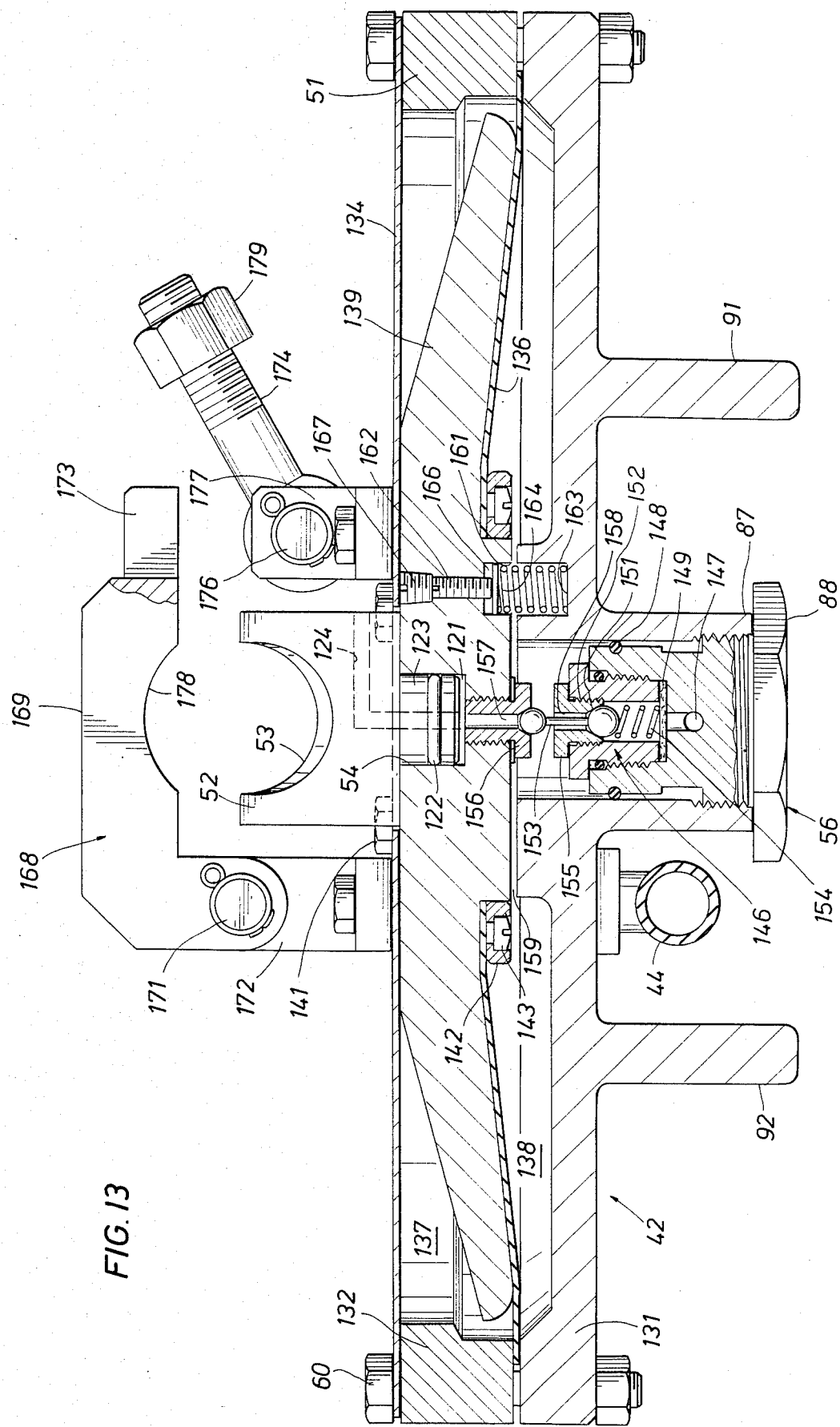
FIG. 13 is an enlarged cross section of the present tension gage.

Referring now to FIG. 13, the tension gage 42 is provided with an adjustment for correcting directly the modulated control signal in the output line 44 for wireline tension conditions under zero hook loading conditions. With this adjustment, the tension gage 42 provides the modulated control signal in precise calibration with the actual weight loading on the wireline. Therefore, the tension gage 42 can be used as a weight indicator.

The tension gage 42 has the body 51 formed by a lower cover 131 and an upper ring cover 132 including a sheet metal plate. A flexible diaphragm 136 is held at its perimeter between the covers by the bolts 60. The diaphragm 136 separates the body 51 into a chamber 137 exposed to atmospheric pressure and a chamber 138 adapted to be at superatmospheric pressure. A diaphragm plate 139 is secured to the plate 134 by cap bolts 141. The post 52 is seated firmly by a projection 123 within opening 54 against the plates 134 and 139.

A vent 124 extends axially through the projection 123 and laterally from the side of the post 52 connecting the chamber 121 with the atmosphere. The diaphragm 136 is held and sealed to the plate 139 by a diaphragm ring 142 releaseably secured by screws 143. A vent port (not shown) connects the chamber 138 with the output signal line 44.

A pressure signal (e.g., air at 60 psig) is passed through nipple 89 into the transducer 56 which includes a differential pilot valve assembly 146. The pilot valve assembly 146 senses the mechanical displacement of the post 52 (including the plates 134 and 139) responsive to wireline loading and produces proportionately a modulated output control signal or pressure in the chamber 138. This control signal may be air varied between 0 and 60 psig over the range of the tension gage 42 (e.g. 0–380,000 pounds).

More particularly, the differential pilot valve system assembly has a inlet 147 formed within the cap 88 and connecting with the nipple 89. The cap 88 is sealed fluid tight to the cover 131 by an O-ring 148. The inlet 147 opens upwardly through a filter 149 into a bushing 151. The bushing 151 carries a valve seat 152 seating one end of a dual ended valve member 153 by the action of a biasing spring 154. The other end of the valve member 153 is seated within a valve seat 156 secured within the plate 139. Passageways 157 and 158 through the seats 152 and 156 provide fluid communication along the valve member 153.

The pilot valve assembly 146, functions in the following manner. The pressure signal at inlet 147 is balanced by the loading of the post 52 upon the plate 139 and the modulated output pressure in chamber 138 acting on the diaphragm 136. An opening 159 is always present between the plate 139 and the cover 131. Assume that the loading on the post 52 increases to a midrange magnitude. As a result, the valve member 153 seats tightly in seat 156 but it is released from seat 152. Pressure signal air flows through the seat 152 until the modulated control pressure in chamber 138 rebalances the diaphragm 136. At this time, the valve member 153 is seated tightly in both seats 152 and 156. This control pressure may be, for example, 30 psig. If the loading on the post decreases to about quarter range, the diaphragm 136 by excess pressure in chamber 138 moves the plate upwardly. As a result, the valve member 153 is seated tightly in seat 152, but it is released from the seat 156. The excess pressure in the chamber 138 is vented to atmosphere by the vent 124 in the post 52. The modulated control pressure in chamber 138 decreases sufficiently to rebalance the diaphragm 136. This control pressure may be, for example, 15 psig. At this time, the valve member 153 again is seated tightly in both seats 152 and 156.

It will be apparent that the modulated control pressure signal in the chamber 138 will always be proportional to the force on the post from the wireline. However, the force on the post does not always precisely reflect the zero wireline tension conditions because of the non-bending characteristics of the wireline at small angles. In accordance with this invention, the gage 42 can be adjusted to a zero (or other desired) minimum magnitude in the modulated control signal for zero wireline tension conditions.

For this purpose, an adjustable mechanism is provided to bias the plate 139 and diaphragm 136 away from the lower cover 132. This bias on the plate 139 and diaphragm 136 is a compensating force for correcting the modulated pressure signal to zero wireline tension conditions. In its preferred form, this mechanism is provided by at least one spring 161 acted on by an adjusting screw 162 for applying a desired separating compensating force between the cover 131 and the plate 139. The spring 161 at one end is seated in a hole 163 formed in the cover 131. The other end of the spring 161 rests in a hole 164 in the plate 139. The screw 162 engages a spring follower 166 seated upon the spring 161. Thus, the screw 162 can be adjusted to compress the spring 161 and provide a desired magnitude or bias or compensating force upwardly on the plate 139 and diaphragm 136. Preferably, the screw 162 is recessed within the plate 139 and the exterior opening is seated by an Allen screw 167 to exclude dirt or unauthorized adjustments. Preferably, a plurality of these compensating spring and screw mechanisms are placed symetrically about the post 52.

This mechanism is relatively easy to adjust as frequently as zero wireline tension conditions are encountered. The input pressure signal (e.g., air at 60 p.s.i.g.) is applied to the tension gage 42. Each screw 162 is adjusted uniformly until the modulated control pressure signal is at the zero magnitude (e.g. 0 p.s.i.g.). After this adjustment, the screws 167 are installed in the plate 139. Now, the tension gage 42 has a zero modulated control pressure signal proportional precisely to zero wireline tension conditions and the readout from the autodriller 43 is the indicated weight on the wireline. As previously mentioned, the modulated control pressure is proportional directly to the tension on the wireline attached to the tension gage 42.

It is preferred to hold the tension gage 42 at one selected position on the wireline so that consistant tension and weight readouts are obtained, or for other reasons. For this purpose, the tension gage 42 may have a clamp 168 to secure the wireline 38 within the saddle 53 of the post 52. The clamp 168 can be formed of a bridge 169 at one side pivoted by a pin 171 upon a support 172 bolted to the plates 134 and 139. The bridge 169 at its other side carries a fork 173 to receive a swing bolt 174. The bolt 174 is pivoted by a pin 176 within a support 177 bolted to the plates 134 and 139. When the bridge 169 is swung over the post 52, a rigid saddle 178 engages the wireline. Then, the bolt 174 is placed into the form 173 and the captive nut 179 tightened to secure the wireline between the post 52 and the bridge 169.

From the foregoing, it will be apparent that there has been provided a novel gage arrangement for indicating the tension conditions upon a wireline associated with oil well drilling operations. This novel gage arrangement permits a ready and simple installation and removal under oil field conditions and without the possibility of any loose parts being lost. In each instance, the gage arrangement can be placed into operative conditions without difficulty in calibration for various oil well drilling operations. It will be appreciated that certain changes or alterations in the present tension gage arrangement may be made without departing from the spirit of this invention. These changes are contemplated by and are within the scope of the appended claims which define the invention. Additionally, the present description is intended to be taken as an illustration of this invention.

What is claimed is:
1. A tension gage for mounting on a wireline between its load and anchor ends comprising:
   (a) an elongated body;
   (b) a post for transmitting forces mounted in said body and at one end carrying a saddle to support the wireline;
   (c) a transmitter acted upon by said post for producing a signal responsive to wireline forces acting on said post and means for calibrating said signal;
   (d) roller assemblies mounted at opposite sides of said post on said body and aligned with the wireline resting in said saddle;
   (e) each of said roller assemblies comprising an upstanding bridge secured at one end to said body and on a shaft rotatably mounting a sheave for engaging the wireline;
   (f) each said shaft journaled to said bridge by an eccentric pivot whereby in a first position said sheave thereon is lifted from the wireline and in a second position said sheave engages the wireline to displace same a certain lateral distance; and
   (g) locking means for holding each said eccentric pivot in the second position whereby said gage is secured to the wireline for measurement of the tension conditions upon the wireline.

2. The tension gage of claim 1 wherein said roller assemblies are equidistant from said post.

3. The tension gage of claim 2 wherein said sheaves with said eccentric pivots in the second position displace the wireline substantially the same lateral distance.

4. The tension gage of claim 1 wherein each of said roller assemblies is comprised of said upstanding bridge releaseably secured to a base integral with said body.

5. The tension gage of claim 4 wherein each said sheave is journaled on said cylindrical shaft carried transversely between spaced apart side members forming said upstanding bridge, and each said shaft is journaled in said side members by off center shaft ends on said cylindrical shaft.

6. The tension gage of claim 5, wherein one of said shaft ends is connected exteriorly of said side members on said upright bridge to a rotary stop having two limits for providing the first and second positions on said eccentric pivot and said limit for said second position is adjustable by a screw mechanism to control the later displacement of the wireline by said sheaves.

7. The tension gage of claim 6 wherein the other end of said shaft is connected exteriorly of said side members to an operating lever adapted to permit movement of said eccentric pivot between the first and second positions of said sheave.

8. The tension gage of claim 4 wherein said upstanding bridge is formed in a U-shape by spaced apart side members having free ends, one of said side members pivotly mounted at its free end to said base and the other of said side members releaseably secured at its free end by a threaded connection to said base, said threaded connection being formed of a captive nut and stud arrangement, and said side members straddling the wireline with said sheaves displacing the wireline towards said base.

9. A tension gage arrangement for mounting a wireline between its load and anchor ends comprising:
 (a) a wireline tension readout device adapted to receive a pneumatic signal and provide an indicator of tension magnitude and change in tension magnitude;
 (b) a tenson sensor mechanism adapted to be secured to the wireline between its load and anchor ends;
 (c) said tension sensor mechanism having an elongated body with a post for transmitting forces mounted in said body and at one end carrying a saddle to support the wireline,;
 (d) a transmitter acted on by said post for producing said pneumatic signal responsive to wireline forces acting on said post;
 (e) a roller mounted at each end of said body by an eccentric pivot, said eccentric pivot in a first position lifting said roller from the wireline and in a second position engaging securely said roller with the wireline to displace same a certain lateral distance at each end of said body but allowing a limited longitudinal movement of the wireline beneath said rollers but securely holding the wireline in said saddle on said post; and
 (f) a calibration rod adapted to be substituted for the wireline, and said rod being dimensioned relative to the wireline to engage by a certain magnitude said post with each said roller in the second position of said eccentric pivot whereby said transmitter produces a predetermined readout in said readout device reflecting a given tension condition on the wireline.

10. The tension gage arrangement of claim 9 wherein said post is formed of two parts adapted to interfit coaxially in a releaseable joint and shim means are received within said releaseable joint whereby said pneumatic signal from said transmitter produces a given readout in said readout device indicative of a given tension condition on the wireline.

11. The tension gage arrangement of claim 10 wherein said readout device carries adjustment means whereby said pneumatic signal can be correlated to a fixed scaler readout increment of the given tension condition on the wireline.

12. The tension gage arrangement of claim 9 wherein a rotary stop is associated with each said eccentric pivot, and said rotary stop is adjustable at the second position to control the lateral displacement of the wireline by each said sheave.

13. A tension gage for mounting on a wireline between its load and anchor ends comprising:
 (a) an elongated body;
 (b) a post for transmitting forces mounted in said body and at one end carrying a saddle to support the wireline;
 (c) a transmitter acted upon by said post for producing a signal responsive to wireline forces acting on said post and means for calibrating said signal;
 (d) roller assemblies mounted at opposite sides of said post on said body and aligned with the wireline resting in said saddle;
 (e) each or said roller assemblies rotatably mounting on a shaft a sheave for engaging the wireline;
 (f) at least one said shaft journaled in the roller assemblies by an eccentric pivot whereby in a first position said sheave thereon is lifted from the wireline and in a second position said sheave engages the wireline to displace same a certain lateral distance; and
 (g) locking means for holding each said eccentric pivot in the second position whereby said gage is secured to the wireline for measurement of the tension conditions upon the wireline.

14. A tension gage for mounting on a wireline between its load and anchor ends comprising:
 (a) an elongated body;
 (b) a post for transmitting forces mounted in said body and at one end carrying a saddle to support the wireline;
 (c) a transmitter acted upon by said post for producing a signal responsive to wireline forces acting on said post and means for calibrating said signal;
 (d) roller assemblies mounted at opposite sides of said post on said body and aligned with the wireline resting in said saddle;
 (e) each of said roller assemblies comprising an upstanding bridge secured at one end to said body and on a shaft rotatably mounting a sheave for engaging the wireline;
 (f) each said shaft journaled to said bridge by a movable mounting whereby said mounting in a first position lifts said sheave from contact with the wireline and said mounting in a second position engages said sheave with the wireline to displace same a certain lateral distance; and
 (g) each said upstanding bridge is formed in a u-shape by spaced apart side members having free ends, one of said side members pivotally mounted at its free end to said body and the other of said side members releaseably secured at its free end by a releaseable connection to said body, and said side members straddling the wireline with said sheaves displacing the wireline towards said body.

15. The tension gage of claim 14 wherein said transmitter includes an input pressure signal, a differential pilot control system modulating the pressure signal responsively to wireline forces acting upon said post for providing said signal representing the wireline forces, and biasing means for providing a compensating force on said differential pilot control system whereby the modulated control signal is corrected for zero wireline tension conditions.

16. The tension gage of claim 15 wherein said biasing means includes a biasing spring and an adjusting screw acting on said biasing spring to provide the compensating force on said differential pilot control system.

17. The tension gage of claim 15 wherein said differential pilot control system includes a diaphragm and a diaphragm plate creating in the body a first chamber, said diaphragm plate forced by said post against said diaphragm for movement towards said first chamber, whereby said differential pilot control system is activated for modulating in said first chamber the input pressure signal responsive to wireline forces acting on said post, and said biasing means include a biasing spring between said diaphragm plate and said body, an adjusting screw acting on said biasing spring whereby a certain biasing force acts against said diaphragm plate and said diaphragm moving towards said first chamber whereby the modulated control signal in said first chamber is corrected for zero wireline tension conditions.

18. A tension gage for mounting on a wireline between its load and anchor ends comprising:
  (a) an elongated body;
  (b) a post for transmitting forces mounted in said body and at one end carrying a saddle to support the wireline;
  (c) a transmitter acted upon by said post for producing a signal responsive to wireline forces acting on said post;
  (d) roller assemblies mounted at opposite sides of said post on said body and aligned with the wireline resting in said saddle;
  (e) each of said roller assemblies comprising an upstanding bridge secured at one end to said body and on a shaft rotatably mounting a sheave for engaging the wireline;
  (f) each said shaft journaled to said bridge by a movable mounting whereby said mounting in a first position lifts said sheave from contact with the wireline and said mounting in a second position engages said sheave with the wireline to displace same a certain lateral distance;
  (g) each said upstanding bridge is formed in a u-shape by spaced apart side members having free ends, one of said side members pivotally mounted at its free end to said body and the other of said side members releaseably secured at its free end by a releaseable connection to said body, and said side members straddling the wireline with said sheaves displacing the wireline towards said body;
  (h) said transmitter including a differential pilot control system, a diaphragm plate creating in said body of a first chamber and a second chamber, said diaphragm plate displaced into said first chamber by wireline forces acting upon said post, said differential pilot control system responding to said diaphragm plate displacement for modulating an input pressure signal and providing in said first chamber of said signal representing wireline forces acting on said post, and biasing means for providing a compensating force on said diaphragm plate for correcting the signal for zero wireline tension conditions.

19. The tension gage of claim 18 wherein said biasing means are a biasing spring for urging said diaphragm plate from the second chamber towards the first chamber and an adjusting spring for acting on said biasing spring for precise adjustment of the compensating force acting on said diaphragm plate.

20. A tension gage for mounting on a wireline between its load and anchor ends comprising
  (a) an elongated body;
  (b) a post for transmitting forces mounted in said body and at one end carrying a saddle to support the wireline;
  (c) a transmitter acted upon by said post for producing a modulated output signal responsive to wireline forces acting on said post;
  (d) cable aligning assemblies mounted at opposite sides of said post on said body and aligned with the wireline resting on said saddle;
  (e) each of said cable aligning assemblies comprising an upstanding bridge means secured at one end to said body for engaging the wireline, and displacing same a certain lateral distance relative to said post whereby said gage is secured to said wireline for measurement of the tension conditions upon the wireline;
  (f) said transmitter including an input pressure signal, a differential pilot control system modulating the input pressure signal responsive to wireline forces acting upon said post and providing said modulated output signal representing the wireline forces;
  (g) biasing means associated with said transmitter for providing a corrective force on said differential pilot control system with said corrective force being applied counter-directionally to the wireline forces acting on said post whereby said modulated output signal is corrected for zero wireline tension conditions; and
  (h) said differential pilot control system including a diaphragm and a diaphragm plate creating in the body a first chamber, said diaphragm plate forced by said post against said diaphragm for movement towards said first chamber, whereby said differential pilot control system is activated for modulating in said first chamber the input pressure signal responsive to wireline forces acting on said post, and said biasing means include a biasing spring between said diaphragm plate and said body, an adjusting screw acting on said biasing spring whereby a certain biasing force acts against said diaphragm plate and said diaphragm moving towards said first chamber whereby the modulated output signal in said first chamber is corrected for zero wireline tension conditions.

21. A tension gage for mounting on a wireline between its load and anchor ends comprising:
  (a) an elongated body;
  (b) a post for transmitting forces mounted in said body and at one end carrying a saddle to support the wireline;
  (c) a transmitter acted upon by said post for producing a signal responsive to wireline forces acting on said post and means for calibrating said signal;
  (d) roller assemblies mounted at opposite sides of said post on said body and aligned with the wireline resting in said saddle;
  (e) each of said roller assemblies comprising an upstanding bridge secured at one end to said body and on a shaft rotatably mounting a sheave for engaging the wireline;
  (f) each said shaft journaled to said bridge by a mounting whereby said sheaves engage the wireline to displace same a lateral distance; and
  (g) each said upstanding bridge is formed in a u-shape by spaced apart side members having free ends, one of said side members pivotally mounted at its free end to said base and the other of said side members releaseably secured at its free end by a connection to said base, said side members straddling the wireline with said sheaves displacing the wireline towards said base when said connection secures the other of said side members to said base, and said side members swinging free of the wire line when said connection of the other of said side members is released.

22. A tension gage for mounting on a wireline between its load and anchor ends comprising:
 (a) an elongated body;
 (b) a post for transmitting forces mounted in said body and at one end carrying a saddle to support the wireline;
 (c) a transmitter acted upon by said post for producing a modulated output signal responsive to wireline forces acting on said post;
 (d) cable aligning assemblies mounted at opposite sides of said post on said body and aligned with the wireline resting on said saddle;
 (e) each of said cable aligning assemblies comprising an upstanding bridge means secured at one end to said body for engaging the wireline, and displacing same a certain lateral distance relative to said post whereby said gage is secured to said wireline for measurement of the tension conditions upon the wireline;
 (f) said transmitter including an input pressure signal, a control system for modulating the input pressure signal responsive to wireline forces acting upon said post and providing said modulated output signal representing the wireline forces;
 (g) biasing means associated with said transmitter for providing a correcting force on said control system for said corrective force being applied counter-directionally to the wireline forces acting on said post whereby said modulated output signal is corrected for zero wireline tension conditions; and
 (h) said control system including a diaphragm and a diaphragm plate creating in said body, a first chamber, said diaphragm plate forced by said post against said diaphragm for movement towards said first chamber, whereby said control system is activated for modulating in said first chamber the input pressure signal responsive to wireline forces acting on said post, and said biasing means include a biasing spring between said diaphragm plate and said body, an adjusting screw acting on said biasing spring whereby a certain biasing force acts against said diaphragm plate and said diaphragm moving towards said first chamber whereby said modulated output signal in said first chamber is corrected for zero wireline tension conditions.

* * * * *